US012026504B2

(12) United States Patent
Katsumata

(10) Patent No.: US 12,026,504 B2
(45) Date of Patent: Jul. 2, 2024

(54) CONTROL SYSTEM AND CONTROL METHOD OF CONTROL SYSTEM

(71) Applicant: TOYOTA JIDOSHA KABUSHIKI KAISHA, Toyota (JP)

(72) Inventor: Tsutomu Katsumata, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 79 days.

(21) Appl. No.: 17/987,176

(22) Filed: Nov. 15, 2022

(65) Prior Publication Data

US 2023/0266962 A1 Aug. 24, 2023

(30) Foreign Application Priority Data

Jan. 11, 2022 (JP) ................................. 2022-002188

(51) Int. Cl.
*G06F 9/445* (2018.01)
*B60R 16/03* (2006.01)
*G06F 8/65* (2018.01)

(52) U.S. Cl.
CPC ................ *G06F 8/65* (2013.01); *B60R 16/03* (2013.01)

(58) Field of Classification Search
CPC ........ G06F 8/65; G06F 21/44; G06F 16/2379; G06F 8/71; G06F 8/61; G06F 3/0625; B60R 16/023; B60R 2300/8073; B60R 16/03; B60R 16/02; B60W 50/00; G07C 5/008; H04W 4/48; H04W 4/14; B60K 35/85; B60K 35/80; B60K 2360/164

USPC ........................................................ 717/168
See application file for complete search history.

(56) References Cited

U.S. PATENT DOCUMENTS

| 2011/0208956 A1* | 8/2011 | Fislage ..................... G06F 8/65 713/2 |
| 2018/0173515 A1* | 6/2018 | Goltz ........................ G06F 8/65 |
| 2021/0155173 A1* | 5/2021 | Harata ................... G06F 9/3836 |
| 2021/0191661 A1 | 6/2021 | Harata et al. |

FOREIGN PATENT DOCUMENTS

JP 2020-027666 A 2/2020

* cited by examiner

*Primary Examiner* — Chuck O Kendall
(74) *Attorney, Agent, or Firm* — Oliff PLC

(57) ABSTRACT

A control system for a vehicle includes: a power source; a first power line; a second power line; a first relay; a second relay; at least one first control device; and at least one second control device. The first control device is configured to transmit a trigger signal to the second control device on condition that the first control device has detected that the first relay has been turned from off to on, and enable a first update program after transmitting the trigger signal. The first update program is an updated version of the first current program. The second control device is configured to enable a second update program on condition that the second control device has received the trigger signal from the first control device. The second update program is an updated version of the second current program.

7 Claims, 7 Drawing Sheets

CONTROL SYSTEM AND CONTROL METHOD OF CONTROL SYSTEM

CROSS-REFERENCE TO RELATED APPLICATION

This application claims priority to Japanese Patent Application No. 2022-002188 filed on Jan. 11, 2022, incorporated herein by reference in its entirety.

BACKGROUND

1. Technical Field

The present disclosure relates to control systems and control methods of the control systems, and more particularly to a control system for a vehicle that can update a program for control, and a control method of the control system.

2. Description of Related Art

There is a technique capable of updating programs that are executed by electronic control units of a vehicle (see, for example, Japanese Unexamined Patent Application Publication No. 2020-27666 (JP 2020-27666 A).

SUMMARY

Each of the cooperating electronic control units simultaneously activates (enables) an updated version of the program in response to an ignition switch being turned from off to on, in order to ensure version consistency with the programs of the other cooperating electronic control units. However, in the case where the ignition switches are turned from off to on immediately after being turned from on to off, the electronic control units continue to operate due to the charge remaining in capacitors when the capacitors are connected to power terminals of the electronic control units. Therefore, a part of the electronic control units to which the capacitor with charge remaining therein is connected cannot detect that the ignition switch has been turned from off to on. This means that a part of the electronic control units to which the capacitor with charge remaining therein is connected cannot activate the update program. On the other hand, the remainder of the electronic control devices that was able to detect the ignition switch having been turned from off to on activates the update program. As a result, version consistency between or among the programs of the cooperating electronic control units cannot be obtained.

The present disclosure provides a control system and a control method of the control system that can avoid program inconsistency.

A control system for a vehicle that is configured to update a program for control according to a second aspect of the present disclosure includes: a power source; a first power line; a second power line; a first relay configured to connect and disconnect an electric circuit between the power source and the first power line; a second relay configured to connect and disconnect an electric circuit between the power source and the second power line; at least one first control device configured to be supplied with electric power by the first power line and operate by executing a first current program; and at least one second control device configured to be supplied with electric power by the second power line and operate by executing a second current program. The first relay and the second relay are configured to be synchronously turned off and on. A first period is shorter than a second period. The first period is a period from when the first relay is turned off to when the electric power supplied to the first control device decreases enough for the first control device to become inoperative. The second period is a period from when the second relay is turned off to when the electric power supplied to the second control device decreases enough for the second control device to become inoperative. The first control device is configured to transmit a trigger signal to the second control device on condition that the first control device has detected that the first relay has been turned from off to on. The first control device is configured to enable a first update program after transmitting the trigger signal. The first update program is an updated version of the first current program. The second control device is configured to enable a second update program on condition that the second control device has received the trigger signal from the first control device. The second update program is an updated version of the second current program.

With such a configuration, after the first relay and the second relay are synchronously turned off, the first control device becomes inoperative first. When the first relay and the second relay are subsequently synchronously turned on, the first control device can detect that the first relay has been turned on. In response to this detection, the first control device transmits the trigger signal to the second control device, and then enables the first update program. The second control device enables the second update program when it receives the trigger signal. Therefore, the second update program of the second control device can be enabled together with the first update program of the first control device regardless of whether the second control device can detect that the second relay has been turned from off to on. As a result, a control system that can avoid program inconsistency can be provided.

In the control system according to the first aspect of the present disclosure, the second control device may be configured to enable the second update program when the second control device has detected that the second relay has been turned from off to on, regardless of the second control device has received the trigger signal from the first control device.

With this configuration, the second control device can enable the second update program regardless of whether the second control device has received the trigger signal. As a result, program inconsistency can further be avoided.

The control system according to the first aspect of the present disclosure may further include: at least one capacitor connected between a ground and a terminal of the first control device to which the first power line is connected; and at least one capacitor connected between the ground and a terminal of the second control device to which the second power line is connected.

With such a configuration, by adjusting capacitances of the first and second power lines, the first and second periods from when the first relay and the second relay are turned off to when the electric power supplied to the first control device and the second control device decreases enough for the first control device and the second control device to become inoperative can be adjusted so that the first period is shorter than the second period. As a result, after the first relay and the second relay are turned off, the first control device can be reliably made inoperative before the second control device.

The control system according to the first aspect of the present disclosure may further include at least one capacitor connected between a ground and a terminal of the second control device to which the second power line is connected. No capacitor may be connected between the ground and a terminal of the first control device to which the first power line is connected.

With such a configuration, the first and second periods from when the first relay and the second relay are turned off to when the electric power supplied to the first control device and the second control device decreases enough for the first control device and the second control device to become inoperative can be reliably set so that the first period is shorter than the second period. As a result, after the first relay and the second relay are turned off, the first control device can be reliably made inoperative before the second control device.

In the control system according to the first aspect of the present disclosure, total capacitance between the ground and the first power line may be less than total capacitance between the ground and the second power line.

In the control system according to the first aspect of the present disclosure, the second control device may be configured to determine whether the second relay has been turned from off to on. The second control device may be configured to, when the second control device determines that the second relay has not been turned from off to on, enable the second update program on condition that the second control device has received the trigger signal.

With such a configuration, the first and second periods from when the first relay and the second relay are turned off to when the electric power supplied to the first control device and the second control device decreases enough for the first control device and the second control device to become inoperative can be compared by identifying the capacitances of the first and second power lines. As a result, the first and second periods can be easily adjusted so that the first period becomes shorter than the second period.

A third aspect of the present disclosure is a control method of a control system for a vehicle, the control system being configured to update a program for control. The control system includes: a power source; a first power line; a second power line; a first relay configured to connect and disconnect an electric circuit between the power source and the first power line; a second relay configured to connect and disconnect an electric circuit between the power source and the second power line; at least one first control device configured to be supplied with electric power by the first power line and operate by executing a first current program; and at least one second control device configured to be supplied with electric power by the second power line and operate by executing a second current program. The first relay and the second relay are configured to be synchronously turned off and on. A first period is shorter than a second period. The first period is a period from when the first relay is turned off to when the electric power supplied to the first control device decreases enough for the first control device to become inoperative. The second period is a period from when the second relay is turned off to when the electric power supplied to the second control device decreases enough for the second control device to become inoperative. The control method includes: transmitting a trigger signal from the first control device to the second control device on condition that the first control device has detected that the first relay has been turned from off to on; enabling a first update program by the first control device after the first control device transmits the trigger signal, the first update program being an updated version of the first current program; and enabling a second update program by the second control device on condition that the second control device has received the trigger signal from the first control device, the second update program being an updated version of the second current program.

With such a configuration, a control method of a control system that can avoid program inconsistency can be provided.

With the present disclosure, a control system and a control method of the control system that can avoid program inconsistency can be provided.

BRIEF DESCRIPTION OF THE DRAWINGS

Features, advantages, and technical and industrial significance of exemplary embodiments of the present disclosure will be described below with reference to the accompanying drawings, in which like signs denote like elements, and wherein.

DETAILED DESCRIPTION OF EMBODIMENTS

Hereinafter, embodiments of the present disclosure will be described in detail with reference to the drawings. The same or corresponding parts are denoted by the same signs throughout the drawings, and description thereof will not be repeated.

First Embodiment

Figure 1:
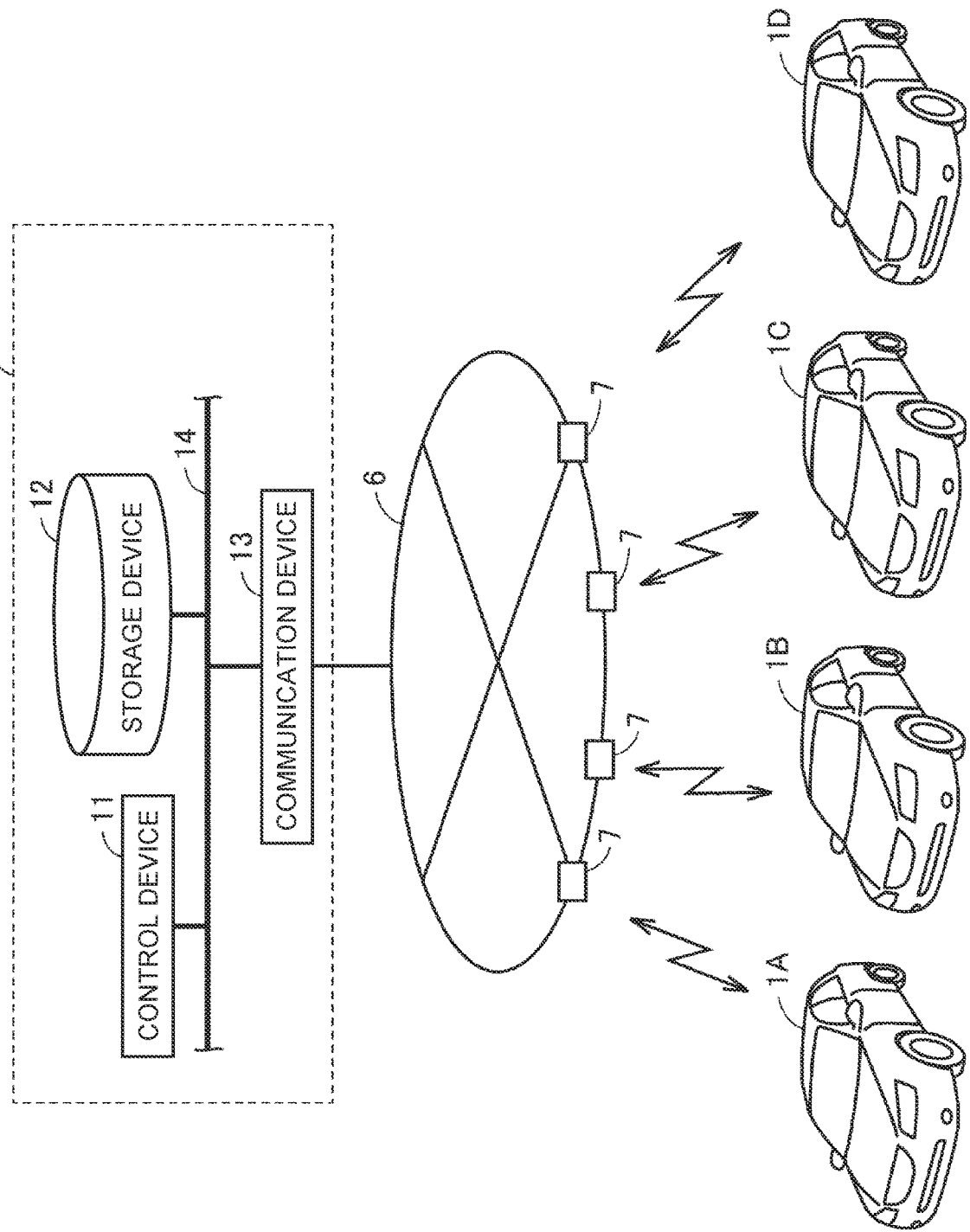
FIG. 1 illustrates an example of the configuration of a system including a management server and a plurality of vehicles that can communicate with the management server according to an embodiment of the present disclosure.

FIG. 1 illustrates an example of the configuration of a system including a management server 10 and a plurality of vehicles 1A to 1D that can communicate with the management server 10 according to an embodiment of the present disclosure.

As shown in FIG. 1, the management server 10 is configured to communicate with a plurality of electrified vehicles including the vehicles 1A to 1D via base stations 7 on a communication network 6. Identification information identifying the vehicles 1A to 1D is stored in advance in the management server 10. The identification information is unique information set for each vehicle. The management server 10 further stores version information, revision information, and update history of various control programs in each of the vehicles 1A to 1D in association with the identification information. The management server 10 manages the update status of the various control programs that are used for the operation of the vehicles 1A to 1D. When a new version of at least one of the control programs is prepared in the management server 10, the management server 10 requests a target vehicle out of the vehicles 1A to 1D to update the control program.

The management server 10 is a computer including a control device 11, a storage device 12, and a communication device 13. The control device 11, the storage device 12, and the communication device 13 are connected to each other via a communication bus 14 so that these devices 11, 12, and 13 can communicate with each other.

The storage device 12 stores a management list including the identification information of the vehicles 1A to 1D and the update status associated with the identification information. The management list may further include other information associated with the identification information (update date and time, update status of each control program, etc.). The communication device 13 implements bidirectional communication between the control device 11 and the communication network 6.

Although not shown in the figure, the control device 11 includes a central processing unit (CPU), a memory (such as a read-only memory (ROM) and a random access memory (RAM)), and an input and output port for inputting and outputting various signals. Various controls that are performed by the control device 11 are performed by software processing, that is, by the CPU reading a program stored in the memory (non-transitory storage medium). The various controls that are performed by the control device 11 can also be implemented by a general-purpose server (not shown) executing a program stored in a storage medium. However, the various controls that are performed by the control device 11 need not necessarily be performed by the software processing, and may be performed by processing with dedicated hardware (electronic circuit).

Although an example in which the management server 10 manages the four vehicles 1A to 1D is illustrated herein, the number of vehicles managed by the management server 10 is not particularly limited to four, and may be three or less, or five or more. The vehicles 1A to 1D will be referred to as the "vehicles 1" when not particularly distinguished from each other.

Figure 2:
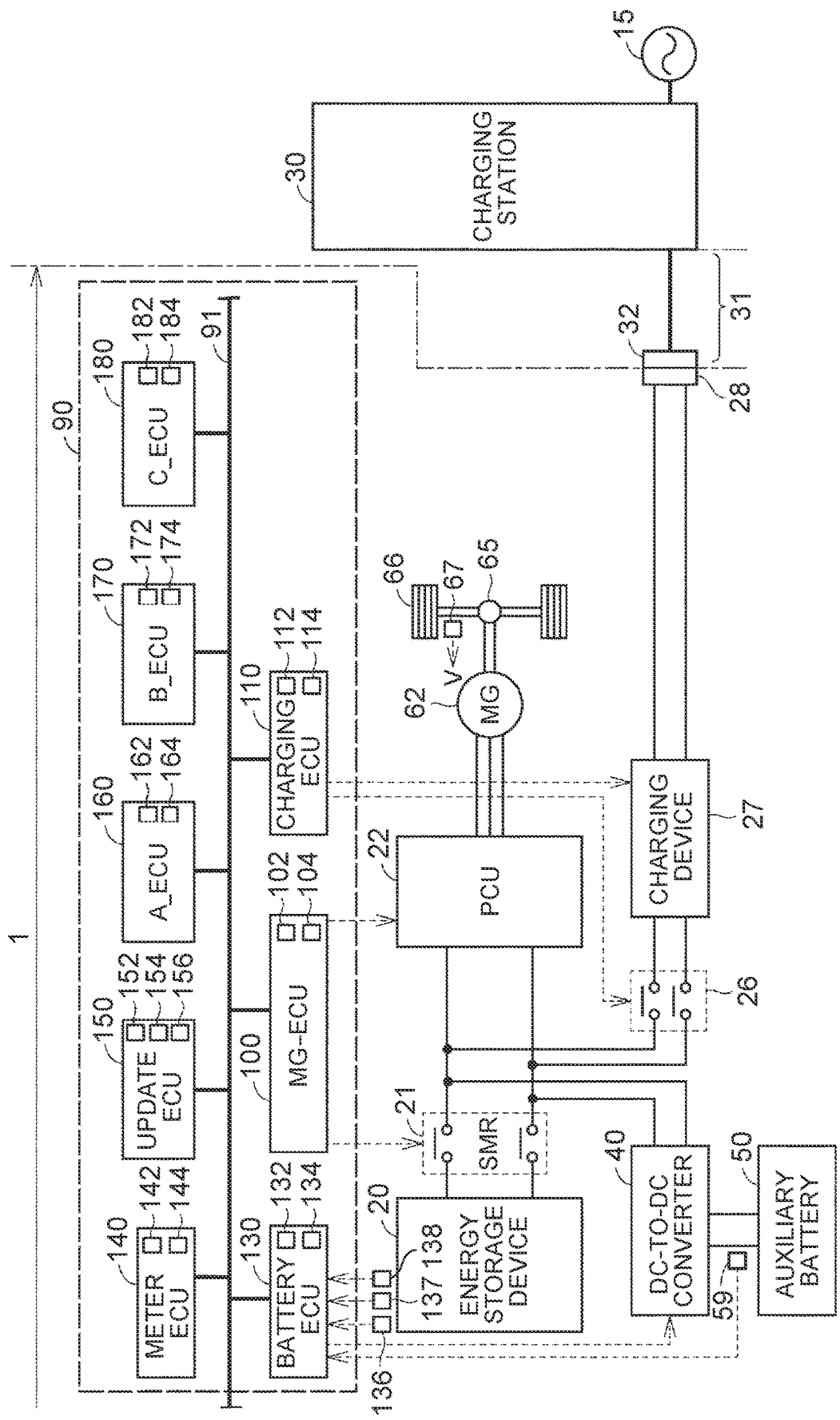
FIG. 2 schematically shows an example of the configuration of the vehicle according to the embodiment.

Next, a specific configuration of the vehicle 1 according to the present embodiment will be described. FIG. 2 schematically shows an example of the configuration of the vehicle 1 according to the present embodiment. Referring to FIG. 2, the vehicle 1 includes an energy storage device 20, a system main relay (SMR) 21, a power control unit (PCU) 22, a direct current-to-direct current (DC-to-DC) converter 40, an auxiliary battery 50, a motor generator (MG) 62, a power transmission gear 65, drive wheels 66, and a control system 90.

The energy storage device 20 is a rechargeable direct current (DC) power supply. The energy storage device 20 includes, for example, a secondary battery such as a nickel metal hydride battery or a lithium-ion battery with a liquid or solid electrolyte. The energy storage device 20 can be a capacitor such as an electric double layer capacitor. The energy storage device 20 supplies electric power for generating a driving force for moving the vehicle 1 to the PCU 22. The energy storage device 20 is charged with electric power generated by the regenerative operation of the MG 62, is discharged by the driving operation of the MG 62, is charged with electric power supplied from the outside of the vehicle, and is discharged by supplying electric power to the outside of the vehicle.

The SMR 21 is electrically connected between the energy storage device and the PCU 22. The SMR 21 is controlled to open and close according to a command from a motor generator electronic control unit (MG-ECU) 100 of the control system 90.

The PCU 22 performs power conversion between the energy storage device 20 and the MG 62 according to a command from the MG-ECU 100 of the control system 90. The PCU 22 includes an inverter that receives electric power from the energy storage device 20 and drives the MG 62, and a converter that adjusts the level of a DC voltage to be supplied to the inverter (both not shown).

The MG 62 is a three-phase alternating current (AC) rotating electrical machine. The MG 62 is, for example, a permanent magnet synchronous motor including a rotor with permanent magnets embedded therein. The MG 62 has both a function as an electric motor (motor) and a function as an electric generator (generator). The MG 62 is connected to the energy storage device 20 via the PCU 22.

For example, when the vehicle 1 is moving, the MG 62 is driven by the inverter of the PCU 22. The power of the MG 62 is transmitted to the drive wheels 66 via the power transmission gear 65. For example, when the vehicle 1 is braked, the MG 62 is driven by the drive wheels 66 and operates as a generator to perform regenerative braking. The electric power generated by the MG 62 is stored in the energy storage device 20 via the PCU 22.

The vehicle 1 further includes a charging relay 26, a charging device 27, and an inlet 28 as a configuration for charging with an AC power supply 15 located outside the vehicle 1 (hereinafter sometimes referred to as "external charging"). A connector 32 is connected to the inlet 28. The connector 32 is connected to a charging station 30 via a cable 31. Although FIG. 2 shows the connector 32 attached to the inlet 28, the connector 32 is detachable from the inlet 28. The connector 32 is attached to the inlet 28 when external charging is performed, and is detached from the inlet 28 when the vehicle 1 is driven. AC power from the AC power supply 15 is supplied to the charging station 30. The AC power becomes ready to be supplied from the charging station 30 to the vehicle 1 when the connector 32 is connected to the inlet 28.

For external charging of the energy storage device 20, electric power is supplied from the charging station 30 to the vehicle 1 via the cable 31, the connector 32, and the inlet 28. The supplied electric power is converted to electric power that can charge the energy storage device 20 (hereinafter referred to as "charging power") by the charging device 27, and the converted charging power is supplied to the energy storage device 20.

The charging relay 26 is electrically connected between the energy storage device 20 and the charging device 27. Electric power becomes ready to be transmitted between the inlet 28 and the energy storage device 20 when the charging relay 26 is closed and the SMR 21 is closed.

The charging device 27 is electrically connected between the charging relay 26 and the inlet 28. The charging device 27 converts electric power (e.g., AC 100 V AC power) supplied from the charging station 30 to charging power (DC power) according to a command from a charging ECU 110 of the control system 90.

The DC-to-DC converter 40 is electrically connected between the SMR 21 and the charging device 27. Therefore, electric power becomes ready to be supplied from the energy storage device 20 to the DC-to-DC converter 40 when the SMR 21 is closed. The DC-to-DC converter 40 steps down a high DC voltage of the energy storage device 20 to a low DC voltage according to a command from a battery ECU 130 of the control system 90, and supplies the low DC voltage thus obtained by stepping down to auxiliary loads (not shown) and the auxiliary battery 50. The auxiliary battery 50 is thus charged.

The auxiliary battery 50 is a secondary battery such as a lead-acid battery. The auxiliary battery 50 can be charged with, and can discharge, a low DC voltage (e.g., electric power of about 12 V) at which the auxiliary loads can operate. For example, a voltage sensor 59 that detects an output voltage of the auxiliary battery 50 is located on a terminal portion of the auxiliary battery 50 or a power line connecting the terminal portion of the auxiliary battery 50 and the DC-to-DC converter 40. The voltage sensor 59 transmits a signal indicating the detected output voltage of the auxiliary battery 50 to the battery ECU 130.

In the present embodiment, the control system 90 includes a plurality of control devices. Specifically, the control system 90 includes the MG-ECU 100, the charging ECU 110, the battery ECU 130, a meter ECU 140, an update ECU 150, an A_ECU 160, a B_ECU 170, and a C_ECU 180. The MG-ECU 100, the charging ECU 110, the battery ECU 130, the meter ECU 140, the update ECU 150, the A_ECU 160, the B_ECU 170, and the C_ECU 180 are connected to each other by a Controller Area Network (CAN) 91 so that these ECUs can communicate with each other. The CAN 91 is an example of a communication network.

The MG-ECU 100 includes a CPU 102, a memory 104, and an input and output port (not shown) for inputting and outputting various signals. The MG-ECU 100 controls the SMR 21 and the PCU 22 in the vehicle 1 so that the vehicle 1 travels in a desired traveling state. Various controls that are performed by the MG-ECU 100 are performed by software processing, that is, by the CPU 102 reading a control program stored in the memory 104.

A wheel speed sensor 67 is connected to the MG-ECU 100. The wheel speed sensor 67 detects the rotational speed (wheel speed) V of the drive wheel 66 and transmits a signal indicating the detected wheel speed V to the MG-ECU 100. The MG-ECU 100 calculates the speed of the vehicle 1 (hereinafter also referred to as "vehicle speed") using the detected wheel speed V.

The charging ECU 110 includes a CPU 112, a memory 114, and an input and output port (not shown) for inputting and outputting various signals. The charging ECU 110 controls the charging relay 26 and the charging device 27 in the vehicle 1 so that the stopped vehicle 1 becomes ready for external charging with the charging station 30. Various controls that are performed by the charging ECU 110 are performed by software processing, that is, by the CPU 112 reading a control program stored in the memory 114.

The battery ECU 130 includes a CPU 132, a memory 134, and an input and output port (not shown) for inputting and outputting various signals. The battery ECU 130 acquires information on the state of the energy storage device 20, calculates the state of charge (SOC) of the energy storage device 20 using the acquired information, and controls the DC-to-DC converter 40 so that the auxiliary battery 50 is charged. Various controls that are performed by the battery ECU 130 are performed by software processing, that is, by the CPU 132 reading a control program stored in the memory 134.

The energy storage device 20 is provided with, for example, a voltage sensor 136, a current sensor 137, and a temperature sensor 138. The voltage sensor 136, the current sensor 137, and the temperature sensor 138 are connected to the battery ECU 130.

The voltage sensor 136 detects the voltage VB of the energy storage device 20 and transmits a signal indicating the detected voltage VB to the battery ECU 130. The current sensor 137 detects the current IB of the energy storage device 20 and transmits a signal indicating the detected current IB to the battery ECU 130. The temperature sensor 138 detects the temperature TB of the energy storage device 20 and transmits a signal indicating the detected temperature TB to the battery ECU 130.

The battery ECU 130 calculates the SOC indicating the remaining capacity of the energy storage device 20 using, for example, the detection results from the voltage sensor 136, the current sensor 137, and the temperature sensor 138. The SOC is the ratio of the current capacity to the capacity in a fully charged state of the energy storage device 20 expressed as a percentage. Various known methods such as a method based on current integration (coulomb counting) and a method based on estimation of the open-circuit voltage (OCV) can be used to calculate the SOC.

The voltage sensor 59 that detects the voltage of the auxiliary battery 50 is also connected to the battery ECU 130. The voltage sensor 59 transmits a signal indicating the detected voltage of the auxiliary battery 50 to the battery ECU 130.

The meter ECU 140 includes a CPU 142, a memory 144, and an input and output port (not shown) for inputting and outputting various signals. The meter ECU 140 performs display control to display predetermined information on a display device in the cabin of the vehicle 1 (e.g., a display device that is located at a position visible to the driver seated in the driver's seat and that displays various gauges such as a speedometer and an odometer and warning lights). Various controls that are performed by the meter ECU 140 are performed by software processing, that is, by the CPU 142 reading a control program stored in the memory 144.

The update ECU 150 includes a CPU 152, a memory 154, a communication device 156, and an input and output port (not shown) for inputting and outputting various signals. The update ECU 150 performs a process of transmitting update information of a control program to at least one of the following ECUs: the MG-ECU 100, the charging ECU 110, the battery ECU 130, the meter ECU 140, the A_ECU 160, the B_ECU 170, and the C_ECU 180, and requesting update of the control program.

The communication device 156 is configured to communicate with equipment located outside the vehicle 1. Specifically, the communication device 156 is configured to communicate with the management server 10 via the communication network 6 and the base station 7. The communication network 6 is, for example, the Internet. The base station 7 and the communication device 156 may be connected by a mobile phone line (e.g., 4th generation (4G) or 5th generation (5G)) so that the base station 7 and the communication device 156 can communicate with each other, or may be connected by wireless communication such as a wireless local area network (LAN).

The update ECU 150 performs a process of requesting execution of an update process so that each ECU executes the update process. Various controls that are performed by the update ECU 150 are performed by software processing, that is, by the CPU 152 reading a program stored in the memory 154. Various processes that are performed by the update ECU 150 need not necessarily be performed by software processing, and may be performed using dedicated hardware (electronic circuit).

Each of the A_ECU 160, the B_ECU 170, and the C_ECU 180 includes a CPU 162, 172, 182, a memory 164, 174, 184, and an input and output port (not shown) for inputting and outputting various signals, respectively. Each of the A_ECU 160, the B_ECU 170, and the C_ECU 180 may be any one of the following ECUs: the MG-ECU 100, the charging ECU 110, the battery ECU 130, the meter ECU 140, and the update ECU 150, or may be an ECU having other function(s).

For example, when the update ECU 150 receives difference data for update and information on an ECU to be updated from the management server 10 via the communication device 156, the update ECU 150 transmits both information indicating a request for execution of an update process and the difference data for update to the ECU to be updated as update information. When the ECU to be updated receives the update information from the update ECU 150, the ECU to be updated executes an update process of updating a control program stored in the memory using the difference data for update included in the received update information.

When updating any of the control programs of the ECUs mounted on the vehicle 1, this update is performed sometimes using data transmitted by wire, and sometimes using update information received from the management server 10 by wireless communication, namely by a so-called over-the-air (OTA) technique.

Figure 3:
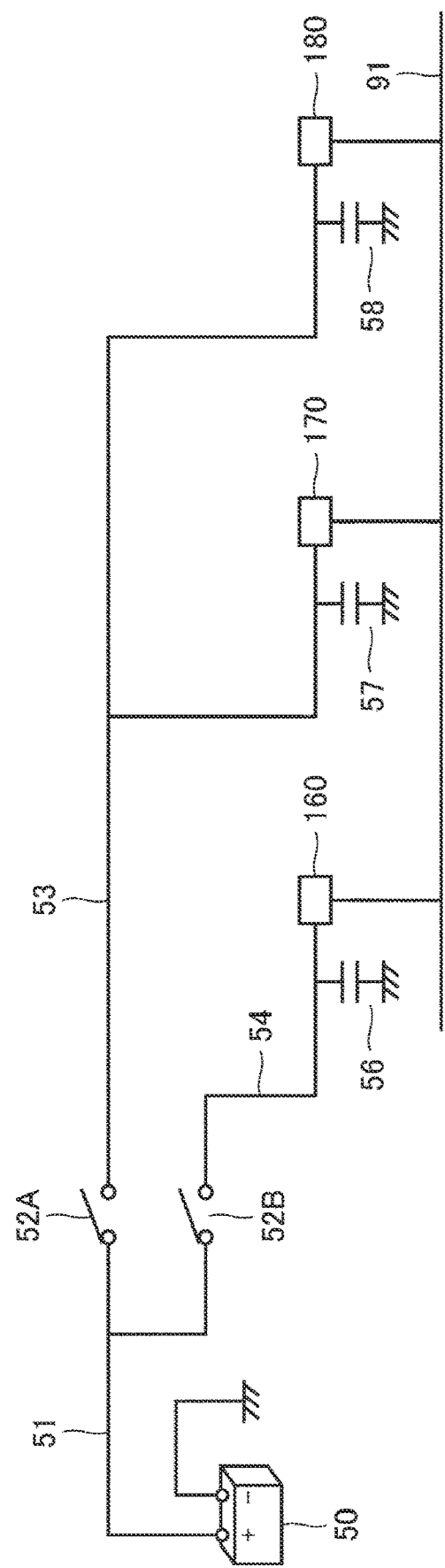
FIG. 3 is a block diagram illustrating update of control programs of electronic control units (ECUs) in the embodiment.

FIG. 3 is a block diagram illustrating update of control programs of ECUs in the present embodiment. As shown in FIG. 3, the ECUs such as the A_ECU 160, the B_ECU 170, and the C_ECU 180 operate using the auxiliary battery 50 as a power source. A power line 51 is connected to a positive electrode of the auxiliary battery 50. A power line 54 is connected to a power terminal of the A_ECU 160. A power line 53 is connected to power terminals of the B_ECU 170 and the C_ECU 180. A capacitor 56 is connected between the power terminal of the A_ECU 160 and the ground. A capacitor 57 is connected between the power terminal of the B_ECU 170 and the ground. A capacitor 58 is connected between the power terminal of the C_ECU 180 and the ground. The capacitors 56 to 58 may be ceramic capacitors, or may be electrolytic capacitors such as aluminum electrolytic capacitors.

An ignition switch 52A is a relay connected between the power line 51 and the power line 53. The ignition switch 52A connects and disconnects the electric circuit between the power lines 51 and 53 in response to an ignition button being turned on and turned off by the user, respectively. An ignition switch 52B is a relay connected between the power line 51 and the power line 54. The ignition switch 52B connects and disconnects the electric circuit between the power lines 51 and 54 in response to the ignition button being turned on and turned off by the user, respectively. The ignition switches 52A, 52B thus synchronously connect and disconnect the electric circuits.

When updating control programs of a plurality of cooperating ECUs using the OTA technique, update information is stored in advance in memories of these ECUs whose control programs are to be updated. The "plurality of cooperating ECUs" refers to at least two ECUs that, when executing a program, execute a process defined by the program while transmitting and receiving information such as data to and from each other. The MG-ECU 100, the battery ECU 130, and the meter ECU 140 are a plurality of cooperating ECUs because the battery ECU 130 transmits information such as the SOC of the battery to the MG-ECU 100 and the meter ECU 140, and the MG-ECU 100 transmits information such as power consumption to the meter ECU 140 and the battery ECU 130. For example, when the A_ECU 160, the B_ECU 170, and the C_ECU 180 cooperate with each other, update information is stored in advance in the memories 164, 174, 184 of these ECUs 160, 170, and 180. Each of the cooperating ECUs simultaneously activates (enables) the updated version of the program in response to the ignition being turned from off to on, in order to ensure version consistency with the programs of the other cooperating ECUs.

However, in the case where the ignition switches 52A, 52B are turned from off to on immediately after being turned from on to off, the A_ECU 160, the B_ECU 170, and the C_ECU 180 continue to operate due to the charge remaining in the capacitors 56, 57, 58 when the capacitors 56, 57, 58 are connected to the power terminals of the A_ECU 160, the B_ECU 170, and the C_ECU 180. Therefore, a part of the ECUs to which the capacitor with charge remaining therein is connected cannot detect that the ignition switch has been turned from off to on, and therefore cannot activate the update program. On the other hand, the remainder of the ECUs that was able to detect the ignition switch having been turned from off to on activates the update program. As a result, version consistency between or among the programs of the cooperating ECUs cannot be obtained.

Therefore, a first period from when the ignition switch 52B is turned off to when the electric power supplied to the A_ECU 160 decreases enough for the A_ECU 160 to be inoperative is made shorter than a second period from when the ignition switch 52A is turned off to when the electric power supplied to the B_ECU 170 and the C_ECU 180 decreases enough for the B_ECU 170 and the C_ECU 180 to be inoperative. The A_ECU 160 enables an update program, namely an update version of the current program for the A_ECU 160, after transmitting a trigger signal to the B_ECU 170 and the C_ECU 180 on condition that the A_ECU 160 has detected that the ignition switch 52B has been turned from off to on. The B_ECU 170 and the C_ECU 180 enable update programs, namely update versions of the current programs for the B_ECU 170 and the C_ECU 180, on condition that the B_ECU 170 and the C_ECU 180 have received the trigger signal from the A_ECU 160.

With this configuration, after the ignition switches 52A, 52B are synchronously turned off, the A_ECU 160 becomes inoperative first. When the ignition switches 52A, 52B are subsequently synchronously turned on, the A_ECU 160 can detect that the ignition switch 52B has been turned on. In response to this detection, the A_ECU 160 transmits a trigger signal to the B_ECU 170 and the C_ECU 180 and then enables the update program for the A_ECU 160. The B_ECU 170 and the C_ECU 180 enable the update programs for the B_ECU 170 and the C_ECU 180 when the B_ECU 170 and the C_ECU 180 receives the trigger signal. The update programs for the B_ECU 170 and the C_ECU 180 can thus be enabled together with the update program for the A_ECU 160, regardless of whether the B_ECU 170 and the C_ECU 180 can detect that the ignition switch 52A has been turned from off to on. As a result, program inconsistency can be avoided.

In FIG. 3, the total capacitance between the power line 54 and the ground (mainly the capacitance of the capacitor 56) is made smaller than the total capacitance between the power line 53 and the ground (mainly the total capacitance of the capacitors 57, 58). The first period from when the ignition switch 52B is turned off to when the electric power supplied to the A_ECU 160 decreases enough for the A_ECU 160 to be inoperative can thus be made shorter than the second period from when the ignition switch 52A is turned off to when the electric power supplied to the B_ECU 170 and the C_ECU 180 decreases enough for the B_ECU 170 and the C_ECU 180 to be inoperative.

Figure 4:
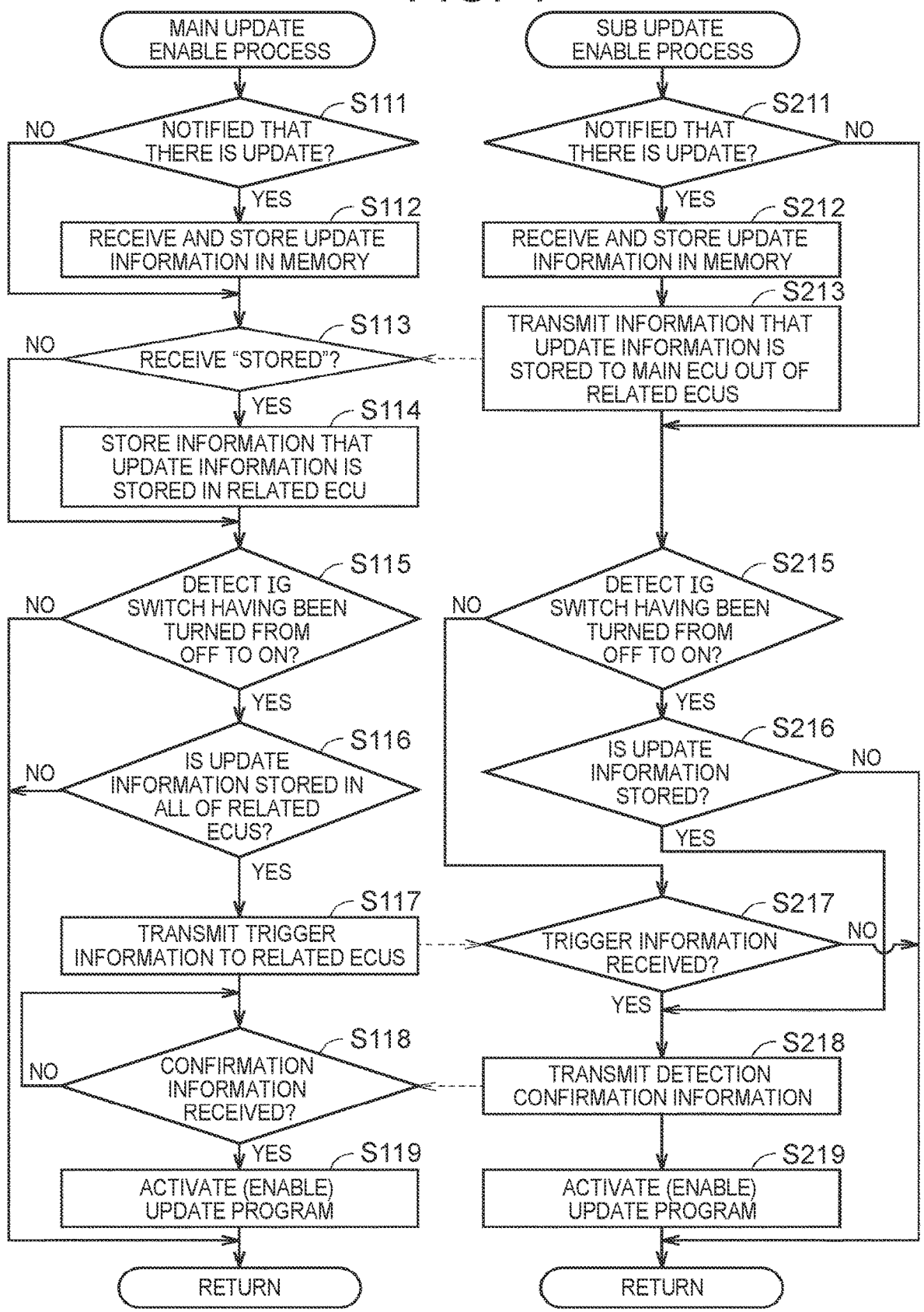
FIG. 4 is a flowchart showing the flow of an update enable process according to a first embodiment.

FIG. 4 is a flowchart showing the flow of an update enable process according to the first embodiment. The process shown in the flowchart of FIG. 4 is called from a higher-level process and executed at predetermined cycles.

Referring to FIG. 4, a main update enable process is executed by the A_ECU 160 that becomes inoperative in a relatively short period after power supply to the A_ECU 160 is stopped as described above. A sub update enable process is executed by the B_ECU 170 and the C_ECU 180 that become inoperative in a relatively long period after power supply to the B_ECU 170 and the C_ECU 180 is stopped as described above.

In the main update enable process, the CPU 162 of the A_ECU 160 first determines whether the CPU 162 of the A_ECU 160 has been notified by the update ECU 150 that there is an update for the control program (step S111). When the CPU 162 of the A_ECU 160 determines that the CPU 162 of the A_ECU 160 has been notified that there is an update (YES in step S111), the CPU 162 of the A_ECU 160 receives update information from the update ECU 150 and stores the received update information in the memory 164 (step S112).

In the sub update enable process, the CPU 172 of the B_ECU 170 and the CPU 182 of the C_ECU 180 first determine whether the CPU 172 of the B_ECU 170 and the CPU 182 of the C_ECU 180 have been notified by the update ECU 150 that there is an update for the control program (step S211). When the CPU 172 of the B_ECU 170 and the CPU 182 of the C_ECU 180 determine that the CPU 172 of the B_ECU 170 and the CPU 182 of the C_ECU 180 have been notified that there is an update (YES in step S211), the CPU 172 of the B_ECU 170 and the CPU 182 of the C_ECU 180 receive update information from the update ECU 150 and stores the received update information in the memories 174, 184, respectively (step S212).

After step S212, each of the CPU 172 of the B_ECU 170 and the CPU 182 of the C_ECU 180 transmits information that the update information is stored to the A_ECU 160 that is a main ECU out of the cooperating related ECUs (step S213).

In the main update enable process, when the CPU 162 of the A_ECU 160 determines that the CPU 162 of the A_ECU 160 has not been notified that there is an update (NO in step S111), or after step S112, the CPU 162 of the A_ECU 160 determines whether the CPU 162 of the A_ECU 160 has received the information that the update information is stored from the B_ECU 170 or the C_ECU 180 (step S113). When the CPU 162 of the A_ECU 160 determines that the CPU 162 of the A_ECU 160 has received the information that the update information is stored (YES in step S113), the CPU 162 of the A_ECU 160 stores, in the memory 164, information that the update information is stored in the related ECU that transmitted the information that the update information is stored (step S114).

When the CPU 162 of the A_ECU 160 determines that the CPU 162 of the A_ECU 160 has not received the information that the update information is stored (NO in step S113), or after step S114, the CPU 162 of the A_ECU 160 determines whether the CPU 162 of the A_ECU 160 has detected that the ignition switch 52B has been turned from off to on (step S115). When the CPU 162 of the A_ECU 160 determines that the CPU 162 of the A_ECU 160 has detected that the ignition switch 52B has been turned from off to on (YES in step S115), the CPU 162 of the A_ECU 160 determines whether information that the update information is stored in all of the related ECUs is stored in the memory 164 (step S116).

When the CPU 162 of the A_ECU 160 determines that the information that the update information is stored in all of the related ECUs is stored in the memory 164 (YES in step S116), the CPU 162 of the A_ECU 160 transmits trigger information for activating the update program to the related ECUs (step S117).

In the sub update enable process, when the CPU 172 of the B_ECU 170 and the CPU 182 of the C_ECU 180 determine that the CPU 172 of the B_ECU 170 and the CPU 182 of the C_ECU 180 have not been notified that there is an update (NO in step S211), or after step S213, the CPU 172 of the B_ECU 170 and the CPU 182 of the C_ECU 180 determine whether the CPU 172 of the B_ECU 170 and the CPU 182 of the C_ECU 180 have detected that the ignition switch 52A has been turned from off to on (step S215). When the CPU 172 of the B_ECU 170 and the CPU 182 of the C_ECU 180 determine that the CPU 172 of the B_ECU 170 and the CPU 182 of the C_ECU 180 have detected that the ignition switch 52A has been turned from off to on (YES in step S215), the CPU 172 of the B_ECU 170 and the CPU 182 of the C_ECU 180 determine whether the update information is stored in the memories 174, 184, respectively (step S216).

When the CPU 172 of the B_ECU 170 and the CPU 182 of the C_ECU 180 determine that the CPU 172 of the B_ECU 170 and the CPU 182 of the C_ECU 180 have not detected that the ignition switch 52A has been turned from off to on (NO in step S215), the CPU 172 of the B_ECU 170 and the CPU 182 of the C_ECU 180 determine whether the CPU 172 of the B_ECU 170 and the CPU 182 of the C_ECU 180 have received the trigger information from the A_ECU 160 (step S217).

When the CPU 172 of the B_ECU 170 and the CPU 182 of the C_ECU 180 determine that the update information is stored (YES in step S216), or when the CPU 172 of the B_ECU 170 and the CPU 182 of the C_ECU 180 determine that the CPU 172 of the B_ECU 170 and the CPU 182 of the C_ECU 180 have received the trigger information (YES in step S217), the CPU 172 of the B_ECU 170 and the CPU 182 of the C_ECU 180 transmit detection confirmation information to the A_ECU 160 (step S218). Thereafter, the CPU 172 of the B_ECU 170 and the CPU 182 of the C_ECU 180 updates the current programs to the update programs using the update information stored in the memories 174, 184, respectively, and activate (enable) the update programs (step S219).

When the CPU 172 of the B_ECU 170 and the CPU 182 of the C_ECU 180 determine that the update information is not stored (NO in step S216), when the CPU 172 of the B_ECU 170 and the CPU 182 of the C_ECU 180 determine that the CPU 172 of the B_ECU 170 and the CPU 182 of the C_ECU 180 have not received the trigger information (NO in step S217), or after step S219, the CPU 172 of the B_ECU 170 and the CPU 182 of the C_ECU 180 returns the process being executed to the higher-level process from which the sub update enable process was called.

In the main update enable process, after step S117, the CPU 162 of the A_ECU 160 checks whether the CPU 162 of the A_ECU 160 has received the detection confirmation information from the B_ECU 170 and the C_ECU 180 (step S118). When the CPU 162 of the A_ECU 160 determines that the CPU 162 of the A_ECU 160 has not received the detection confirmation information (NO in step S118), the CPU 162 of the A_ECU 160 repeats step S118.

When the CPU 162 of the A_ECU 160 determines that the CPU 162 of the A_ECU 160 has received the detection confirmation information (YES in step S118), the CPU 162 of the A_ECU 160 updates the current program to the update program using the update information stored in the memory 164, and activates (enables) the update program (step S119).

When the CPU 162 of the A_ECU 160 determines that the CPU 162 of the A_ECU 160 has not detected that the ignition switch 52B has been turned from off to on (NO in step S115), when the CPU 162 of the A_ECU 160 determines that the information that the update information is stored in all of the related ECUs is not stored (NO in step S116), or after step S119, the CPU 162 of the A_ECU 160 returns the process being executed to the higher-level process from which the main update enable process was called.

Figure 5:
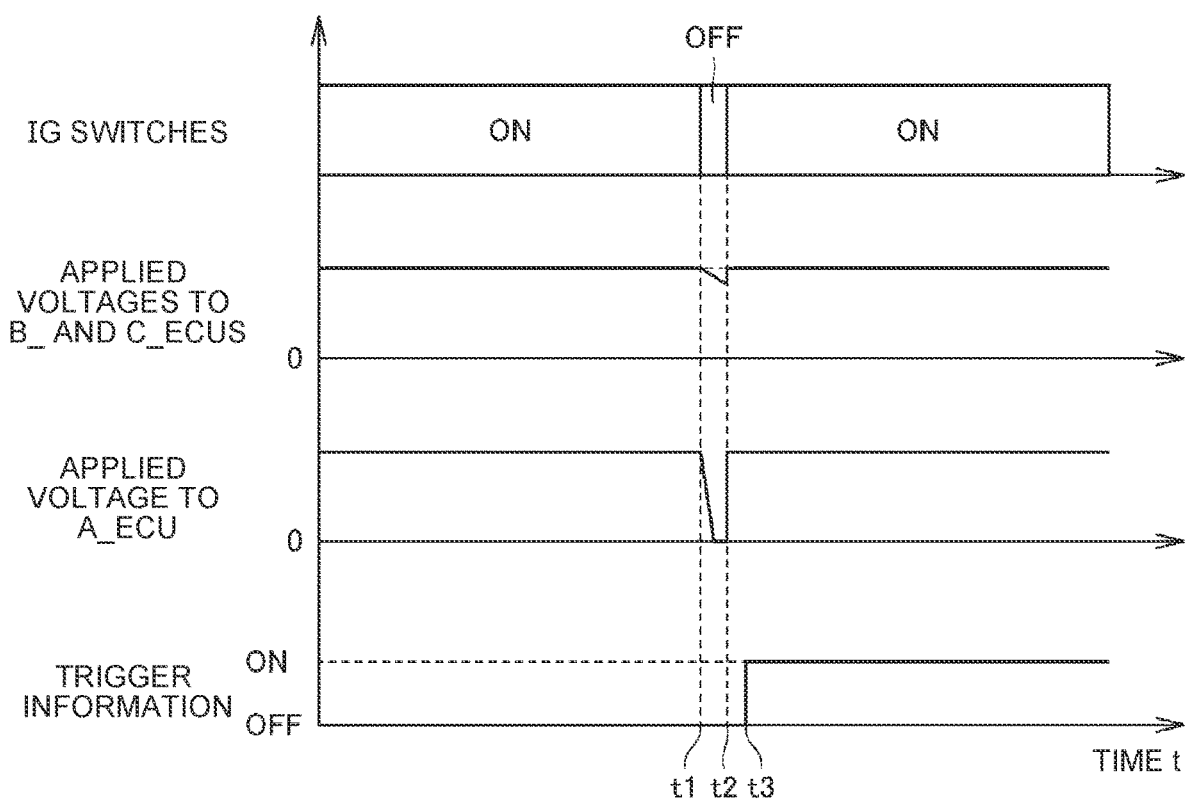
FIG. 5 is a timing chart showing an example of changes in voltage applied to the ECUs in response to ignition switches being turned on and off, and a change in trigger information according to the embodiment.

FIG. 5 is a timing chart showing an example of changes in voltage applied to the ECUs in response to the ignition switches 52A, 52B being turned on and off, and a change in trigger information according to the present embodiment. As shown in FIG. 5, when the ignition switches 52A, 52B are turned from on to off at time t1, the voltage from the auxiliary battery 50 is no longer applied to the power terminals of the A_ECU 160, B_ECU 170, and C_ECU 180, and the voltage of the charge stored in the capacitor 56 is applied to the power terminal of the A_ECU 160, and the voltage of the charge stored in the capacitors 57, 58 is applied to the power terminals of the B_ECU 170 and C_ECU 180, respectively.

The total capacitance between the power line 54 and the ground (mainly the capacitance of the capacitor 56) is smaller than the total capacitance between the power line 53 and the ground (mainly the total capacitance of the capacitors 57, 58). The first period from when the ignition switch 52B is turned off to when the electric power supplied to the A_ECU 160 decreases enough for the A_ECU 160 to be inoperative is thus shorter than the second period from when the ignition switch 52A is turned off to when the electric power supplied to the B_ECU 170 and the C_ECU 180 decreases enough for the B_ECU 170 and the C_ECU 180 to be inoperative. That is, as shown in FIG. 5, the voltage applied to the A_ECU 160 drops earlier than the voltages applied to the B_ECU 170 and the C_ECU 180 between time t1 and time t2.

When the ignition switches 52A, 52B are switched from off to on at time t2, the voltage from the auxiliary battery 50 is applied again to the A_ECU 160, the B_ECU 170, and the C_ECU 180. The A_ECU 160 that has been inoperative therefore starts operating again. The A_ECU 160 executes the main update enable process shown in FIG. 4. As the A_ECU 160 performs step S117 at time t3, the trigger information is transmitted from the A_ECU 160 to the B_ECU 170 and the C_ECU 180.

The voltages applied to the B_ECU 170 and the C_ECU 180 do not drop to the voltage at which the B_ECU 170 and the C_ECU 180 become inoperative, and the voltage from the auxiliary battery 50 is applied again to the B_ECU 170 and the C_ECU 180. Therefore, the B_ECU 170 and the C_ECU 180 cannot detect that ignition switch 52A has been turned from off to on. However, as the B_ECU 170 and the C_ECU 180 receive the trigger information transmitted from the A_ECU 160, the B_ECU 170 and the C_ECU 180 can indirectly detect that the ignition switch 52A has been turned from off to on.

By receiving the trigger information, the B_ECU 170 and the C_ECU 180 can thus indirectly detect that the ignition switch 52A has been turned from off to on, regardless of whether the B_ECU 170 and the C_ECU 180 can directly detect that the ignition switch 52A has been turned from off to on. Accordingly, the update programs for the B_ECU 170 and the C_ECU 180 can be activated (enabled) together with the update program for the A_ECU 160. As a result, program inconsistency can be avoided.

Second Embodiment

In the first embodiment, as shown in step S215 in FIG. 4, even the B_ECU 170 and the C_ECU 180 that become inoperative in a relatively long period after power supply to the B_ECU 170 and the C_ECU 180 is stopped are configured to directly detect that the ignition switch 52A has been turned from off to on. In a second embodiment, the B_ECU 170 and the C_ECU 180 that become inoperative in a relatively long period after power supply to the B_ECU 170 and the C_ECU 180 is stopped are configured not to directly detect that the ignition switch 52A has been turned from off to on.

Figure 6:
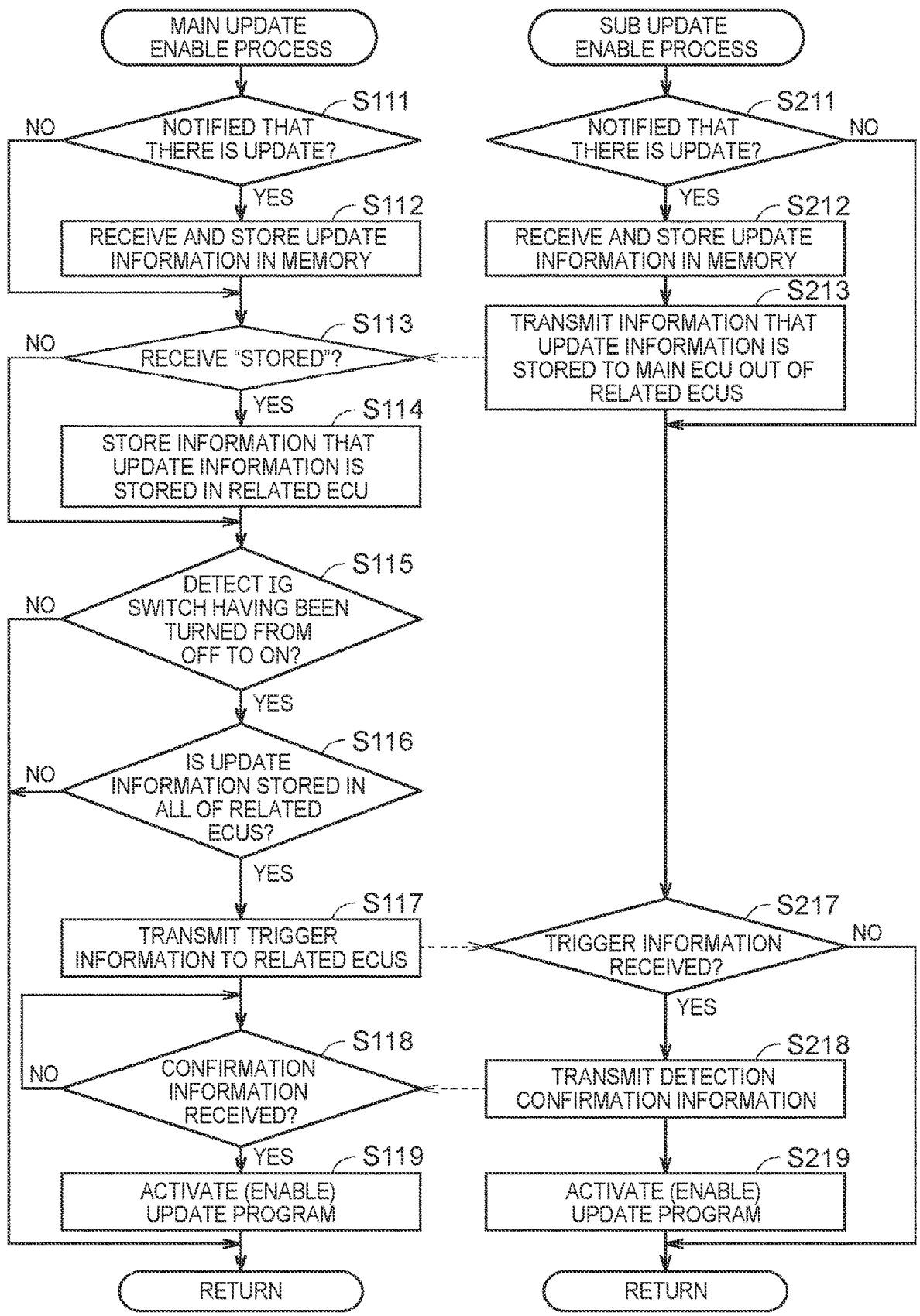
FIG. 6 is a flowchart showing the flow of an update enable process according to a second embodiment.

FIG. 6 is a flowchart showing the flow of an update enable process according to the second embodiment. The process shown in the flowchart of FIG. 6 is called from a higher-level process and executed at predetermined cycles. As shown in FIG. 6, the process of FIG. 6 is a process in that steps S215 and S216 are eliminated from the sub update enable process of FIG. 4. The other steps are the same between FIG. 4 and FIG. 6.

In this configuration as well, the B_ECU 170 and the C_ECU 180 cannot directly detect that ignition switch 52A has been turned from off to on. However, by receiving the trigger information, the B_ECU 170 and the C_ECU 180 can indirectly detect that the ignition switch 52A has been turned from off to on. Accordingly, the update programs for the B_ECU 170 and the C_ECU 180 can be activated (enabled) together with the update program for the A_ECU 160. As a result, program inconsistency can be avoided.

Third Embodiment

In the first and second embodiments, as shown in FIGS. 4 and 6, the A_ECU 160 that becomes inoperative in a relatively short period after power supply to the A_ECU 160 is stopped and the B_ECU 170 and the C_ECU 180 that become inoperative in a relatively long period after power supply to the B_ECU 170 and the C_ECU 180 is stopped perform different processes from each other. In a third embodiment, the A_ECU 160 that becomes inoperative in a relatively short period after power supply to the A_ECU 160 is stopped and the B_ECU 170 and the C_ECU 180 that become inoperative in a relatively long period after power supply to the B_ECU 170 and the C_ECU 180 is stopped perform the same process.

Figure 7:
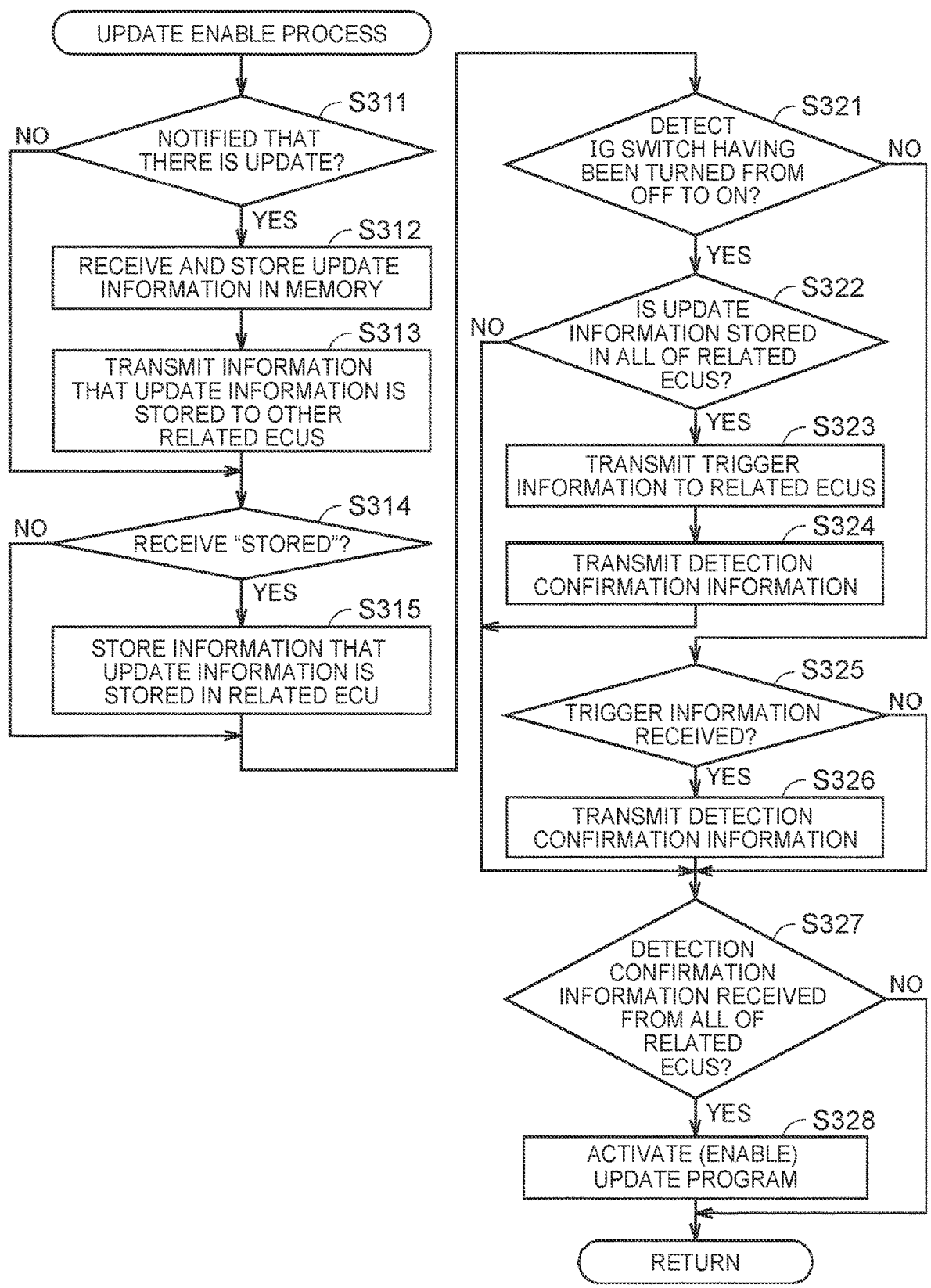
FIG. 7 is a flowchart showing the flow of an update enable process according to a third embodiment.

FIG. 7 is a flowchart showing the flow of an update enable process according to the third embodiment. The process shown in the flowchart of FIG. 7 is called from a higher-level process and executed at predetermined cycles. Referring to FIG. 7, this update enable process is performed by both the A_ECU 160 that becomes inoperative in a relatively short period after power supply to the A_ECU 160 is stopped and the B_ECU 170 and the C_ECU 180 that become inoperative in a relatively long period after power supply to the B_ECU 170 and the C_ECU 180 is stopped.

First, the CPU 162 of the A_ECU 160, the CPU 172 of the B_ECU 170, and the CPU 182 of the C_ECU 180 determine whether the CPU 162 of the A_ECU 160, the CPU 172 of the B_ECU 170, and the CPU 182 of the C_ECU 180 have been notified by the update ECU 150 that there is an update for the control program (step S311). When the CPU 162 of the A_ECU 160, the CPU 172 of the B_ECU 170, and the CPU 182 of the C_ECU 180 determine that the CPU 162 of the A_ECU 160, the CPU 172 of the B_ECU 170, and the CPU 182 of the C_ECU 180 have been notified that there is an update (YES in step S311), the CPU 162 of the A_ECU 160, the CPU 172 of the B_ECU 170, and the CPU 182 of the C_ECU 180 receive update information from the update ECU 150 and store the received update information in the memories 164, 174, 184, respectively (step S312).

After step S312, each of the CPU 162 of the A_ECU 160, the CPU 172 of the B_ECU 170, and the CPU 182 of the C_ECU 180 transmits information that the update information is stored to the other cooperating related ECUs (step S313).

When the CPU 162 of the A_ECU 160, the CPU 172 of the B_ECU 170, and the CPU 182 of the C_ECU 180 determine that the CPU 162 of the A_ECU 160, the CPU 172 of the B_ECU 170, and the CPU 182 of the C_ECU 180 have not been notified that there is an update (NO in step S311), or after step S313, the CPU 162 of the A_ECU 160, the CPU 172 of the B_ECU 170, and the CPU 182 of the C_ECU 180 determine whether the CPU 162 of the A_ECU 160, the CPU 172 of the B_ECU 170, and the CPU 182 of the C_ECU 180 have received the information that the update information is stored from any of the other cooperating related ECUs (step S314). When the CPU 162 of the A_ECU 160, the CPU 172 of the B_ECU 170, and the CPU 182 of the C_ECU 180 determine that the CPU 162 of the A_ECU 160, the CPU 172 of the B_ECU 170, and the CPU 182 of the C_ECU 180 have received the information that the update information is stored (YES in step S314), the CPU 162 of the A_ECU 160, the CPU 172 of the B_ECU 170, and the CPU 182 of the C_ECU 180 store, in the memories 164, 174, 184, information that the update information is stored in the related ECU that transmitted the information that the update information is stored (step S315).

When the CPU 162 of the A_ECU 160, the CPU 172 of the B_ECU 170, and the CPU 182 of the C_ECU 180 determine that the CPU 162 of the A_ECU 160, the CPU 172 of the B_ECU 170, and the CPU 182 of the C_ECU 180 have not received the information that the update information is stored (NO in step S314), or after step S315, one of the CPU 162 of the A_ECU 160, the CPU 172 of the B_ECU 170, and the CPU 182 of the C_ECU 180 determines whether it has detected that the ignition switch 52A or the ignition switch 52B has been turned from off to on (step S321). When the one of the CPU 162 of the A_ECU 160, the CPU 172 of the B_ECU 170, and the CPU 182 of the C_ECU 180 determines that it has detected that the ignition switch 52A or the ignition switch 52B has been turned from off to on (YES in step S321), the one of the CPU 162 of the A_ECU 160, the CPU 172 of the B_ECU 170, and the CPU 182 of the C_ECU 180 determines whether information that the update information is stored in all of the other related ECUs is stored in the memory 164, 174, 184 (step S322).

When the one of the CPU 162 of the A_ECU 160, the CPU 172 of the B_ECU 170, and the CPU 182 of the C_ECU 180 determines that the information that the update information is stored in all of the other related ECUs is stored (YES in step S322), the one of the CPU 162 of the A_ECU 160, the CPU 172 of the B_ECU 170, and the CPU 182 of the C_ECU 180 transmits trigger information for activating the update program to the other related ECUs (step S323). Thereafter, the one of the CPU 162 of the A_ECU 160, the CPU 172 of the B_ECU 170, and the CPU 182 of the C_ECU 180 transmits detection confirmation information to the other related ECUs (step S324).

When the one of the CPU 162 of the A_ECU 160, the CPU 172 of the B_ECU 170, and the CPU 182 of the C_ECU 180 determines that it has not detected that the ignition switch 52A or the ignition switch 52B has been turned from off to on (NO in step S321), the CPU 162 of the A_ECU 160, the CPU 172 of the B_ECU 170, and the CPU 182 of the C_ECU 180 determine whether the CPU 162 of the A_ECU 160, the CPU 172 of the B_ECU 170, and the CPU 182 of the C_ECU 180 have received the trigger information from any of the other related ECUs (step S325).

When the CPU 162 of the A_ECU 160, the CPU 172 of the B_ECU 170, and the CPU 182 of the C_ECU 180 determine that the CPU 162 of the A_ECU 160, the CPU 172 of the B_ECU 170, and the CPU 182 of the C_ECU 180 have received the trigger information (YES in step S325), the CPU 162 of the A_ECU 160, the CPU 172 of the B_ECU 170, and the CPU 182 of the C_ECU 180 transmits detection confirmation information to the other related ECUs (step S326).

When the one of the CPU 162 of the A_ECU 160, the CPU 172 of the B_ECU 170, and the CPU 182 of the C_ECU 180 determines that the information that the update information is stored in all of the other related ECUs is not stored (NO in step S322), after step S324, or after step S326, the CPU 162 of the A_ECU 160, the CPU 172 of the B_ECU 170, and the CPU 182 of the C_ECU 180 determine whether the CPU 162 of the A_ECU 160, the CPU 172 of the B_ECU 170, and the CPU 182 of the C_ECU 180 have received the detection confirmation information from all of the other related ECUs (step S327).

When the CPU 162 of the A_ECU 160, the CPU 172 of the B_ECU 170, and the CPU 182 of the C_ECU 180 determine that they have received the detection confirmation information from all of the other related ECUs (YES in step S327), each of the CPU 162 of the A_ECU 160, the CPU 172 of the B_ECU 170, and the CPU 182 of the C_ECU 180 updates the current program to the update program using the update information stored in the memory 164, 174, 184, and activates (enables) the update program (step S328).

When the CPU 162 of the A_ECU 160, the CPU 172 of the B_ECU 170, and the CPU 182 of the C_ECU 180 determine that they have not received the detection confirmation information (NO in step S327), or after step S328, each of the CPU 162 of the A_ECU 160, the CPU 172 of the B_ECU 170, and the CPU 182 of the C_ECU 180 returns the process being executed to the higher-level process from which this update enable process was called.

With this configuration, not only the ECU that was able to directly detect that the ignition switch 52A, 52B had been turned from off to on but also the ECU that was able to indirectly detect that the ignition switch 52A, 52B had been turned from off to on by receiving the trigger information from the ECU that was able to directly detect that the ignition switch 52A, 52B had been turned from off to on can activate (enable) the update program along with the other related ECUs. As a result, program inconsistency can be avoided.

Other Modifications (1) In the above embodiments, as shown in FIG. 2, the vehicles 1A to 1D are battery electric vehicles (BEVs). However, the vehicles 1A to 1D are not limited to BEVs, and the vehicles 1A to 1D may be any type of vehicles such as hybrid electric vehicles (HEVs), plug-in hybrid electric vehicles (PHEVs), fuel cell electric vehicles (FCEVs), or vehicles that are not equipped with a motor powered by electricity such as the MG 62 but are equipped with an engine powered by fuel (e.g., gasoline, light oil, heavy oil, liquefied petroleum gas (LPG), liquefied natural gas (LNG), ethanol, or hydrogen).

(2) In the above embodiments, as shown in FIG. 2, the vehicles 1A to 1D are not vehicles capable of autonomous driving and automated parking. However, the present disclosure is not limited to this, and the vehicles 1A to 1D may be vehicles capable of autonomous driving or may be vehicles capable of automated parking.

(3) In the above embodiments, as shown in FIG. 3, the capacitor 56 is connected between the ground and the power terminal of the A_ECU 160, namely an ECU connected to a power line whose total capacitance between the power line and the ground is smaller than that of another power line. However, the present disclosure is not limited to this, and the capacitor may not be connected between the ground and the power terminal of the A_ECU 160, namely an ECU connected to a power line whose total capacitance between the power line and the ground is smaller than that of another power line.

(4) In the above embodiments, as shown in FIG. 3, one A_ECU 160 and one capacitor 56 are connected to the path composed of: the power line 54 whose total capacitance between the power line and the ground is smaller than that of another power line; and the ignition switch 52B. However, the present disclosure is not limited to this, and two or more ECUs may be connected to the path composed of the power line 54 and the ignition switch 52B, or two or more capacitors may be connected to the path composed of the power line 54 and the ignition switch 52B.

(5) In the above embodiments, as shown in FIG. 3, the path composed of the power line 53 and the ignition switch 52A is the only one path that is different from the path composed of: the power line 54 whose total capacitance between the power line and the ground is smaller than that of another power line; and the ignition switch 52B. However, the present disclosure is not limited to this, and there may be two or more paths that are different from the path composed of: the power line 54 whose total capacitance between the power line and the ground is smaller than that of another power line; and the ignition switch 52B.

(6) In the above embodiments, as shown in FIG. 3, the capacitors 57, 58 are connected to the B_ECU 170 and the C_ECU 180, namely all the ECUs in the path different from the path composed of: the power line 54 whose total capacitance between the power line and the ground is smaller than that of another power line; and the ignition switch 52B. However, the present disclosure is not limited to this, and a capacitor may be connected to a part of a plurality of ECUs in the path different from the path composed of: the power line 54 whose total capacitance between the power line and the ground is smaller than that of another power line; and the ignition switch 52B.

(7) In the above embodiments, as shown in FIGS. 1 and 2, update information for updating the program of each ECU is transmitted from the management server 10 to the vehicles 1A to 1D by wireless communication. However, the present disclosure is not limited to this, and the update information may be transmitted from an update device to the vehicles 1A to 1D by wired communication.

(8) In the above embodiments, as shown in FIG. 3, the power source for the A_ECU 160, B_ECU 170, and C_ECU 180 is the auxiliary battery 50 with a low voltage of about 12V. However, the present disclosure is not limited to this, and the power source for the A_ECU 160, B_ECU 170, and C_ECU 180 may be other energy storage devices. For example, the power source for the A_ECU 160, B_ECU 170, and C_ECU 180 may be a high voltage battery like the energy storage device 20, or a capacitor.

(9) The above embodiments can be regarded as disclosure of the vehicle 1 or a control system including a plurality of control devices such as the ECUs of the vehicle 1, or can be regarded as disclosure of the vehicle 1, a control method of the control system, or a control program.

(1) With the control system of the present disclosure, after a first relay and a second relay are synchronously turned off, a first control device becomes inoperative first. When the first relay and the second relay are subsequently synchronously turned on, the first control device can detect that the first relay has been turned on. In response to this detection, the first control device transmits a trigger signal to a second control device, and then enables the first update program. The second control device enables a second update program when it receives the trigger signal. Therefore, the second update program of the second control device can be enabled together with the first update program of the first control device regardless of whether the second control device can detect that the second relay has been turned from off to on. As a result, program inconsistency can be avoided.

(2) With the control system of the present disclosure, the second control device can enable the second update program regardless of whether the second control device has received the trigger signal. As a result, program inconsistency can be more reliably avoided.

(3) With the control system of the present disclosure, by adjusting the capacitances of first and second power lines, the first and second periods from when the first relay and the second relay are turned off to when the electric power supplied to the first control device and the second control device decreases enough for the first control device and the second control device to become inoperative can be adjusted so that the first period is shorter than the second period. As a result, after the first relay and the second relay are turned off, the first control device can be reliably made inoperative before the second control device.

(4) With the control system of the present disclosure, the first and second periods from when the first relay and the second relay are turned off to when the electric power supplied to the first control device and the second control device decreases enough for the first control device and the second control device to become inoperative can be reliably set so that the first period is shorter than the second period. As a result, after the first relay and the second relay are turned off, the first control device can be reliably made inoperative before the second control device.

(5) With the control system of the present disclosure, the first and second periods from when the first relay and the second relay are turned off to when the electric power supplied to the first control device and the second control device decreases enough for the first control device and the second control device to become inoperative can be compared by identifying the capacitances of the first and second power lines. As a result, the first and second periods can be easily adjusted so that the first period becomes shorter than the second period.

The embodiments disclosed herein should be construed as illustrative, not restrictive, in all respects. The scope of the present disclosure is shown by the claims rather than by the above description of the embodiments and is intended to include all modifications within the meaning and scope equivalent to the claims.

What is claimed is:

1. A control system for a vehicle, the control system being configured to update a program for control, the control system comprising:
   a power source;
   a first power line;
   a second power line;
   a first relay configured to connect and disconnect an electric circuit between the power source and the first power line;
   a second relay configured to connect and disconnect an electric circuit between the power source and the second power line;
   at least one first control device configured to be supplied with electric power by the first power line and operate by executing a first current program; and
   at least one second control device configured to be supplied with electric power by the second power line and operate by executing a second current program, wherein:
   the first relay and the second relay are configured to be synchronously turned off and on;
   a first period is shorter than a second period, the first period being a period from when the first relay is turned off to when the electric power supplied to the first control device decreases enough for the first control device to become inoperative, and the second period being a period from when the second relay is turned off to when the electric power supplied to the second control device decreases enough for the second control device to become inoperative;
   the first control device is configured to
      transmit a trigger signal to the second control device on condition that the first control device has detected that the first relay has been turned from off to on, and
      enable a first update program after transmitting the trigger signal, the first update program being an updated version of the first current program; and
   the second control device is configured to enable a second update program on condition that the second control device has received the trigger signal from the first control device, the second update program being an updated version of the second current program.

2. The control system according to claim 1, wherein the second control device is configured to enable the second update program when the second control device has detected that the second relay has been turned from off to on, regardless of the second control device has received the trigger signal from the first control device.

3. The control system according to claim 1, further comprising:
   at least one capacitor connected between a ground and a terminal of the first control device to which the first power line is connected; and
   at least one capacitor connected between the ground and a terminal of the second control device to which the second power line is connected.

4. The control system according to claim 1, further comprising at least one capacitor connected between a ground and a terminal of the second control device to which the second power line is connected, wherein no capacitor is connected between the ground and a terminal of the first control device to which the first power line is connected.

5. The control system according to claim 3, wherein total capacitance between the ground and the first power line is less than total capacitance between the ground and the second power line.

6. The control system according to claim 1, wherein the second control device is configured to:
   determine whether the second relay has been turned from off to on; and
   when the second control device determines that the second relay has not been turned from off to on, enable the second update program on condition that the second control device has received the trigger signal.

7. A control method of a control system for a vehicle, the control system being configured to update a program for control, the control system including
   a power source,
   a first power line,
   a second power line,
   a first relay configured to connect and disconnect an electric circuit between the power source and the first power line,
   a second relay configured to connect and disconnect an electric circuit between the power source and the second power line, the first relay and the second relay being configured to be synchronously turned off and on,
   at least one first control device configured to be supplied with electric power by the first power line and operate by executing a first current program, and
   at least one second control device configured to be supplied with electric power by the second power line and operate by executing a second current program, a first period being shorter than a second period, the first period being a period from when the first relay is turned off to when the electric power supplied to the first control device decreases enough for the first control device to become inoperative, and the second period being a period from when the second relay is turned off to when the electric power supplied to the second control device decreases enough for the second control device to become inoperative,
   the control method comprising:
   transmitting a trigger signal from the first control device to the second control device on condition that the first control device has detected that the first relay has been turned from off to on;
   enabling a first update program by the first control device after the first control device transmits the trigger signal, the first update program being an updated version of the first current program; and
   enabling a second update program by the second control device on condition that the second control device has received the trigger signal from the first control device, the second update program being an updated version of the second current program.

* * * * *